United States Patent [19]

Nordstrom

[11] Patent Number: 4,993,895

[45] Date of Patent: Feb. 19, 1991

[54] APPARATUS FOR RETAINING A TILE IN A SECURE POSITION TO PREVENT ROTATION WHILE AN OPENING IS DRILLED THROUGH THE TILE

[76] Inventor: Edward Nordstrom, 3611 Kelton Ave., Los Angeles, Calif. 90034

[21] Appl. No.: 462,148

[22] Filed: Jan. 8, 1990

[51] Int. Cl.⁵ .............................................. B23B 41/00
[52] U.S. Cl. .................................... 408/103; 269/287; 269/289 R; 408/241 R
[58] Field of Search ............... 408/103, 110, 111, 112, 408/241 R; 279/14; 269/287, 289 R, 296

[56] References Cited

U.S. PATENT DOCUMENTS 1,515,063  11/1924  Mackey ................................ 269/287
1,701,144   7/1929  Weston .
1,816,266   2/1931  Shogran .
2,914,332  11/1959  Cervini ................................ 408/239
4,436,356   1/1984  Stelling ............................ 269/289 R

FOREIGN PATENT DOCUMENTS 1303282  4/1987  U.S.S.R. ................................ 408/103

Primary Examiner—Daniel W. Howell
Attorney, Agent, or Firm—Thomas I. Rozsa

[57] ABSTRACT

An apparatus for retaining a tile in a secure position to prevent rotation while an opening is drilled through the tile. The apparatus includes a surface having a multiplicity of concentric interior stepped depressions, each interior depression set beneath and within another, with each respective depression sized to be slightly larger than the standard dimensions of a conventional tile. The respective depression can be used to securely hold its respective sized conventional tile while a transverse force is applied to the tile to create an opening through the tile.

14 Claims, 1 Drawing Sheet

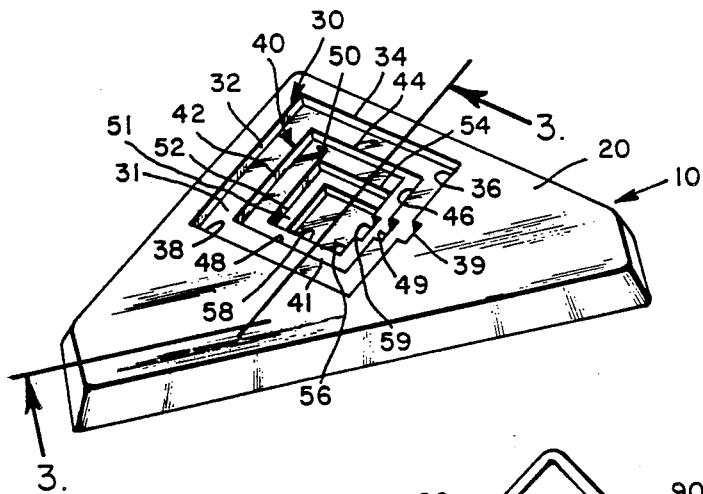
Fig. 1.
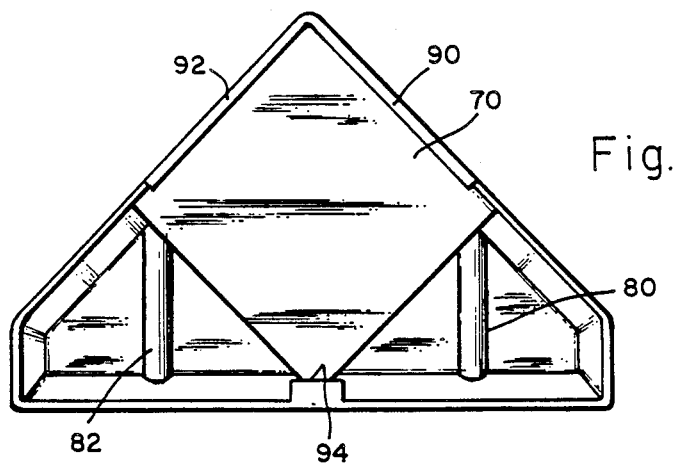
Fig. 2.
Fig. 3.
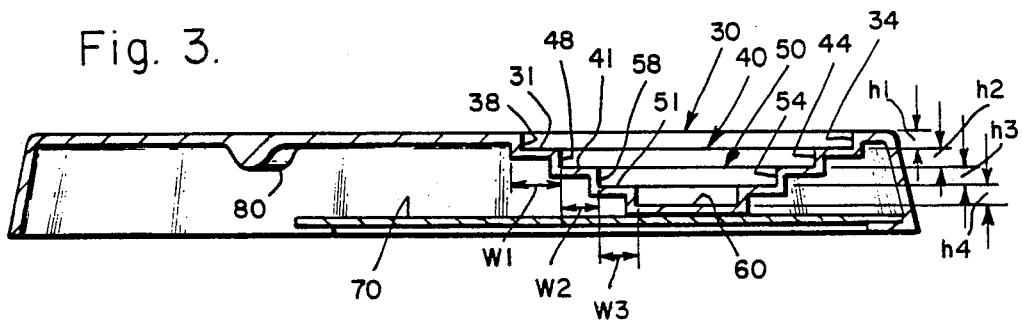
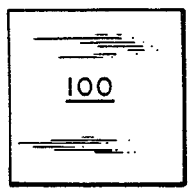
Fig. 4.
Fig. 5.
Fig. 6.

APPARATUS FOR RETAINING A TILE IN A SECURE POSITION TO PREVENT ROTATION WHILE AN OPENING IS DRILLED THROUGH THE TILE

BACKGROUND OF THE INVENTION

1. FIELD OF THE INVENTION

The present invention relates to the field of construction assistance apparatus which permits a workman to more efficiently work on a piece of construction material. More particularly, the present invention relates to the construction field of tile setting and to an apparatus which enables a tile to be held in a secure position while a hole is being drilled through it.

2. DESCRIPTION OF THE PRIOR ART

Tile setting involves placing customary tiles which are generally square on a surface such as the wall of a bathroom or kitchen. Tiles conventionally come in three standard sizes, $4\frac{1}{4}$ inches square, 6 inches square and 8 inches square. A problem arises when it is necessary to set tile over an opening such as the location of the shower pipe opening, the bathtub water pipe opening and the hot and cold faucet water pipe openings. Since tile is made of fragile material such as fired clay, stone or similar material which can fracture when a transverse force is applied to it, drilling a hole through the tile to accommodate the location of the openings of water pipe outlets is a problem. One known method is to chip away at the tile and carefully knock a hole through the tile by chipping away bits of the over time, which is a time consuming process. Another method is to hold the tile in one hand while a drill is used to drill the hole. This is very difficult because the tile itself will rotate as the hole is being drilled and it is difficult and dangerous to hold the tile in one hand while the hole is being drilled through it with the other hand. In addition to spinning, the tile can also easily break or at best an irregular hole is created. A third method is to brace the tile against a surface such as a wall or table. In addition to being difficult to control the tile, another problem is that the drill can penetrate and damage the surface of the wall or table against which the tile is braced.

The inventor is unaware of any prior art which specifically addresses the problem which this invention solves. The closest prior art which relates to the general structure of the present invention is embodied in the following three patents:

1. U.S. Pat. No. 4,436,356 issued to Stelling on Mar. 13, 1984 for "Oven Supporting Apparatus Incorporating Slidable Cookware Support".
2. U.S. Pat. No. 1,702,144 issued to Weston in 1929 for "Pastry Board".
3. U.S. Pat. No. 1,816,266 issued to Shogran in 1931 for "Artificial Flower Making Device".

U.S. Pat. No. 4,436,356 issued to Stelling discloses a member having a upper surface comprising a series of concentric step depressions for supporting various sized cookware utilized in conjunction with an oven.

U.S. Pat. No. 1,702,144 discloses a pastry board which includes a block 8 which is a cutting support on which items such as bread can be cut.

U.S. Pat. No. 1,816,266 illustrates an artificial flower making device including a plate 1 for supporting the artificial flower as it is being created.

Overall, none of the prior art addresses the problem of holding a tile in a steady and secure position while an opening for a plumbing fixture is being drilled through the tile.

SUMMARY OF THE PRESENT INVENTION

The present invention is an apparatus for retaining a tile in a secure position to prevent rotation while an opening is drilled through the tile.

It has been discovered, according to the present invention, that if a surface comprises a multiplicity of concentric interior stepped depressions, each interior depression set beneath and within another, with each respective depression sized to be slightly larger than the standard dimensions of a conventional tile, then the respective depression can be used to securely hold its respective sized conventional tile while a transverse force is applied to the tile to create an opening through the tile.

It has further been discovered, according to the present invention, that if each corresponding stepped depression is approximately 8 inches square, approximately 6 inches square and approximately $4\frac{1}{4}$ inches square, then the respective stepped depressions can accommodate a conventional sized tile and hold it in a secure position.

It has additionally been discovered, according to the present invention, that if the undersurface of the structure housing the concentric generally square stepped depressions has a metal backing plate, then the plate will serve to block the force of the drill bit and prevent it from penetrating the surface on which the apparatus rests.

It is therefore an object of the present invention to provide an apparatus which can securely hold standard sized tiles which are $4\frac{1}{4}$ inches square, 6 inches square and 8 inches square to permit a transverse force to be applied to the tile for the purpose of creating an opening through the tile.

It is another object of the present invention to provide an apparatus which will safely hold a tile and further provide a barrier to prevent a drill bit from marring a surface after it has penetrated the tile.

It is an additional object of the present invention to provide an apparatus which can be easily fabricated to make an inexpensive tile holding apparatus.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

FIG. 1 is a top plan view of the present invention tile retaining apparatus.

FIG. 2 is a bottom plan view of the present invention tile retaining apparatus.

FIG. 3 is a cross-sectional view taken along line 3—3 of FIG. 1.

FIG. 4 is a top plan view of an 8 inch square tile.

FIG. 5 is a top plan view of a 6 inch square tile.

FIG. 6 is a top plan view of a $4\frac{1}{4}$ inch square tile.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1, there is shown at 10 the present invention tile retaining apparatus. The essential portion of the invention is an upper surface 20 which has set therein three concentric generally square stepped depressions. Outermost stepped depression 30 has four sidewalls 32, 34, 36 and 38 which form a square and which surround base 31. Each sidewall is approximately 8 inches long, with the preferred dimension being approximately 8 1/16 inches to provide a small gap to allow for slight tile size variance and to facilitate inserting and removing the tile. Base 31 can be of any width so long as it is sufficient to hold the bottom of a tile. By way of example, the width W1 of base 31 can be approximately 1 inch on each of its four surfaces adjacent a respective sidewall. One wall such as wall 36 further comprises a gap 39 by which an object such as a screwdriver can be inserted to more easily remove a tile. Most tiles are conventionally ¼ inch thick. Therefore, in the preferred embodiment, the height h1 of each of the four walls 32, 34, 36 and 38 is approximately ¼ inch. An eight inch tile such as that illustrated in FIG. 4 can be inserted within outermost stepped depression 30.

Middle stepped depression 40 has four sidewalls 42, 44, 46 and 48 which form a square and which extend from the interiormost portion of base 31 and which in turn surround base 41. Each sidewall is approximately 6 inches long, with the preferred dimension being approximately 6 1/16 inches to provide a small gap to allow for slight tile size variance and to facilitate inserting and removing the tile. Base 41 can be of any width so long as it is sufficient to hold the bottom of a tile. By way of example, the width W2 of base 41 can be approximately 1 inch on each of its four surfaces adjacent a respective sidewall. One wall such as wall 46 further comprises a gap 49 by which an object such as a screwdriver can be inserted to more easily remove a tile. Most tiles are conventionally ¼ inch thick. Therefore, in the preferred embodiment, the height h2 of each of the four walls 42, 44, 46 and 48 is approximately ¼ inch. A six inch tile such as that illustrated in FIG. 5 can be inserted within middle stepped depression 40.

Innermost stepped depression 50 has four sidewalls 52, 54, 56 and 58 which form a square and which extend from the interiormost portion of base 41 and which in turn surround base 51. Each sidewall is approximately 4¼ inches long, with the preferred dimension being approximately 6 5/16 inches to provide a small gap to allow for slight tile size variance and to facilitate inserting and removing the tile. Base 51 can be of any width so long as it is sufficient to hold the bottom of a tile. By way of example, the width W3 of base 51 can be approximately 1 inch on each of its four surfaces adjacent a respective sidewall. One wall such as wall 56 further comprises a gap 59 by which an object such as a screwdriver can be inserted to more easily remove a tile. Most tiles are conventionally ¼ inch thick. Therefore, in the preferred embodiment, the height h3 of each of the four walls 52, 54, 56 and 58 is approximately ¼ inch. A four and one-quarter inch tile such as that illustrated in FIG. 6 can be inserted within innermost stepped depression 50.

Beneath innermost stepped depression 50 is a chamber 60 to provide a recess for receiving the tip of the drill bit after it has passed through the tile. While the recess 60 is illustrated as square, it does not have to be square and can be of any desired shape. By way of example, the height h4 of the chamber 60 be approximately ¾ inch. Set within tile holding apparatus 10 and beneath all of the concentric stepped depressions 30, 40 and 50, is a stop plate 70 which is positioned to stop the drill bit from going further and marring the surface on which the tile retaining apparatus 10 is placed. In the preferred embodiment, the stop plate 70 is made of metal such as aluminum or steel.

For ease of fabrication, the tile retaining apparatus is preferably molded out of tough strong plastic or rubber. To assist in the strength of the apparatus 10, interior strengthening ribs 80 and 82 are molded into the framework. The three concentric generally square stepped depressions 30, 40 and 50 are molded into the apparatus 10. The stop plate 70 can be removably retained therein by molded ledges 90 and 92 and insert gap 94.

Therefore, the present invention can be defined as an apparatus for retaining tiles to prevent rotation while an opening is drilled in a tile, comprising: (a) a supporting structure having an upper surface; (b) a first stepped depression extending from the interior of the upper surface of said supporting structure and having four generally perpendicular walls to form a square and an interior base surrounded by the four walls and having a generally square interior opening; (c) a second stepped depression set within the first stepped depression and being smaller than the first stepped depression, the second stepped depression having four generally perpendicular walls to form a square extending perpendicularly from the interior opening of the base of the first stepped depression and having an interior base surrounded by the four walls of the second stepped depression and having a generally square interior opening; (d) a third stepped depression set within the second stepped depression and being smaller than the second stepped depression, the third stepped depression having four generally perpendicular walls to form a square extending perpendicularly from the interior opening of the base of the second stepped depression and having an interior base surrounded by the four walls of the third stepped depression and having an interior opening; (e) the length and height of the walls of each stepped depression sized to fit a tile; and (f) a stop plate set beneath the third stepped depression.

In use, the tile retaining apparatus 10 is placed on a horizontal surface such as a workbench or table and the desired tile is inserted into its respective sized stepped depression and set on its respective base. For example, if an 8 inch tile 100 is to be worked on, it is set on base 31 and surrounded by walls 32, 34, 36, 38. If a six inch tile 110 is to be worked on, it is set on base 41 and surrounded by walls 42, 44, 46 and 48. If a 4¼ inch tile 120 is to be worked on, it is set on base 51 and surrounded by walls 52, 54, 56 and 58. The center point of the tile is chipped to provide a starting point for a drill bit and a drill bit with a hole cutting chuck is used to drill the hole of any desired diameter. One hand can be used to press down on the upper surface 20 of tile retaining apparatus 10 while the other hand operates the drill. Through use of the present invention, the operator can safely and securely hold the tile in place while the appropriate sized opening is drilled through it.

While the three stepped depressions 30, 40 and 50 are shown as being concentric, it is also within the spirit and scope of the present invention for the three stepped depressions 30, 40 and 50 to be spaced apart at different locations on surface 20. However, it is a much less efficient design than the preferred embodiment of the present invention.

The invention can therefore be defined more broadly as an apparatus for retaining tiles to prevent rotation while an opening is drilled in a tile, comprising: (a) a supporting structure; (b) an open first stepped depression within said supporting structure and having four generally perpendicular walls to form a square and an interior base surrounded by the four walls; (c) an open second stepped depression within said supporting structure and being smaller than the first stepped depression, the second stepped depression having four generally perpendicular walls to form a square and having an interior base surrounded by the four walls of the second stepped depression; (d) an open third stepped depression within said supporting structure and being smaller than the second stepped depression, the third stepped depression having four generally perpendicular walls to form a square and having an interior base surrounded by the four walls of the third stepped depression and having an interior opening; (e) the length and height of the walls of each stepped depression sized to fit a tile; and (f) a stop plate set beneath the third stepped depression.

The overall shape of the apparatus for retaining a tile 10 is illustrated with an aerodynamic shape corresponding to the Stealth Bomber—R to provide it with an aesthetic appearance. However, it is will be appreciated that the overall shape for the apparatus for retaining a tile 10 is not important for functional purposes and the overall shape can be of any configuration.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus for retaining tiles to prevent rotation while an opening is drilled in a tile, comprising:
    a. a supporting structure having an upper surface;
    b. a first stepped depression extending from the interior of the upper surface of said supporting structure and having four generally perpendicular walls to form a square and an interior base surrounded by the four walls and having a generally square interior opening;
    c. a second stepped depression set within the first stepped depression and being smaller than the first stepped depression, the second stepped depression having four generally perpendicular walls to form a square extending perpendicularly from the interior opening of the base of the first stepped depression and having an interior base surrounded by the four walls of the second stepped depression and having a generally square interior opening;
    d. a third stepped depression set within the second stepped depression and being smaller than the second stepped depression, the third stepped depression having four generally perpendicular walls to form a square extending perpendicularly from the interior opening of the base of the second stepped depression and having an interior base surrounded by the four walls of the third stepped depression and having an interior opening;
    e. the length and height of the walls of each stepped depression sized to fit a tile;
    f. a stop plate set beneath the third stepped depression; and
    g. a gap in at least one of the four walls of each of the three stepped depression.

2. An apparatus for retaining tiles to prevent rotation while an opening is drilled in a tile in accordance with claim 1 wherein said support structure is made of molded plastic.

3. An apparatus for retaining tiles to prevent rotation while an opening is drilled in a tile in accordance with claim 1 wherein said stop plate is made of metal.

4. An apparatus for retaining tiles to prevent rotation while an opening is drilled in a tile in accordance with claim 1 wherein said support structure further comprises strengthening ribs.

5. An apparatus for retaining tiles to prevent rotation while an opening is drilled in a tile in accordance with claim 1, further comprising a recess chamber aligned with the opening in the base of the third stepped depression and set between the third stepped depression and the stop plate.

6. An apparatus for retaining tiles to prevent rotation while an opening is drilled in a tile in accordance with claim 1, wherein the length of each of the four walls of the first stepped depression is approximately 8 inches, the length of each of the four walls of the second stepped depression is approximately 6 inches, the length of each of the four walls of the third stepped depression is approximately $4\frac{1}{4}$ inches, and the height of each of the four walls for each of the three stepped depressions is approximately $\frac{1}{4}$ inch.

7. An apparatus for retaining tiles to prevent rotation while an opening is drilled in a tile in accordance with claim 1, wherein the three stepped depressions are concentric.

8. An apparatus for retaining tiles to prevent rotation while an opening is drilled in a tile, comprising:
    a. a supporting structure;
    b. an open first stepped depression within said supporting structure and having four generally perpendicular walls to form a square and an interior base surrounded by the four walls;
    c. an open second stepped depression within said supporting structure and being smaller than the first stepped depression, the second stepped depression having four generally perpendicular walls to form a square and having an interior base surrounded by the four walls of the second stepped depression;
    d. an open third stepped depression within said supporting structure and being smaller than the second stepped depression, the third stepped depression having four generally perpendicular walls to form a square and having an interior base surrounded by the four walls of the third stepped depression and having an interior opening;

e. the length and height of the walls of each stepped depression sized to fit a tile;

f. a stop plate set beneath the third stepped depression; and g. a gap in at least one of the four walls of each of the three stepped depressions.

9. An apparatus for retaining tiles to prevent rotation while an opening is drilled in a tile in accordance with claim 8 wherein said support structure is made of molded plastic.

10. An apparatus for retaining tiles to prevent rotation while an opening is drilled in a tile in accordance with claim 8 wherein said stop plate is made of metal.

11. An apparatus for retaining tiles to prevent rotation while an opening is drilled in a tile in accordance with claim 8 wherein said support structure further comprises strengthening ribs.

12. An apparatus for retaining tiles to prevent rotation while an opening is drilled in a tile in accordance with claim 8, further comprising a recess chamber aligned with the opening in the base of the third stepped depression and set between the third stepped depression and the stop plate.

13. An apparatus for retaining tiles to prevent rotation while an opening is drilled in a tile in accordance with claim 8, wherein the length of each of the four walls of the first stepped depression is approximately 8 inches, the length of each of the four walls of the second stepped depression is approximately 6 inches, the length of each of the four walls of the third stepped depression is approximately $4\frac{1}{4}$ inches, and the height of each of the four walls for each of the three stepped depressions is approximately $\frac{1}{4}$ inch.

14. An apparatus for retaining tiles to prevent rotation while an opening is drilled in a tile in accordance with claim 8, wherein the three stepped depressions are concentric.

* * * * *